United States Patent [19]

Kobayashi et al.

[11] Patent Number: 4,617,986

[45] Date of Patent: Oct. 21, 1986

[54] AIR CONDITIONING ARRANGEMENT FOR AUTOMOTIVE VEHICLE OR THE LIKE

[75] Inventors: Shinma Kobayashi; Shunsuke Kajita, both of Hiratsuka, Japan

[73] Assignee: Nissan Shatai Company, Limited, Hiratsuka, Japan

[21] Appl. No.: 527,784

[22] Filed: Aug. 30, 1983

[30] Foreign Application Priority Data

Aug. 31, 1982 [JP] Japan ................................. 57-150143

[51] Int. Cl.⁴ .............................................. B60H 3/00
[52] U.S. Cl. ....................................... 165/42; 62/244; 236/91 C
[58] Field of Search ......................... 165/12, 16, 30, 40, 165/41, 42, 43; 236/13, 49, 91 R, 91 F, 91 C; 62/239, 243, 244; 98/2.01, 2.11; 237/12.3 A, 12.3 B

[56] References Cited

U.S. PATENT DOCUMENTS

| | | | |
|---|---|---|---|
| 3,934,642 | 1/1976 | Coulson et al. | 165/23 |
| 4,344,565 | 8/1982 | Kojima et al. | 165/12 |
| 4,417,688 | 11/1983 | Schnaibel et al. | 236/91 F |
| 4,460,036 | 7/1984 | Yoshimi et al. | 62/244 X |
| 4,478,274 | 10/1984 | Naganoma et al. | 62/244 X |
| 4,482,009 | 11/1984 | Nishimura et al. | 62/244 X |
| 4,513,808 | 4/1985 | Ito et al. | 62/244 X |

*Primary Examiner*—Harry Tanner
*Attorney, Agent, or Firm*—Schwartz, Jeffery, Schwaab, Mack, Blumenthal & Evans

[57] ABSTRACT

The temperature of the air discharged into the upper region of an enclosed space such as an automotive vehicle cabin and the temperature of the air discharged separately into the lower region thereof, is individually controlled in response to a manually inputted command signal (or signals) and in response to at least one (sensed) parameter which affects the environment of said enclosed space whereby the temperature of each region can be varied according to personal taste.

18 Claims, 6 Drawing Figures

AIR CONDITIONING ARRANGEMENT FOR AUTOMOTIVE VEHICLE OR THE LIKE

BACKGROUND OF THE INVENTION

1. Field of the Invention

The present invention relates generally to an air conditioning unit for conditioning the air in an enclosed space such as the cabin of an automotive vehicle or the like, and more specifically to an improved arrangement wherein individual control of the temperature in distinct zones or regions is possible.

2. Description of the Prior Art

In a previously proposed arrangement it has been arranged that bi-level control be provided so that cool air may be directed toward the face and upper region of a vehicle passenger while warm air is directed toward the lower section of the cabin about the legs of the passenger or passengers. This arrangement while providing some degree of versatility has not proven successful, especially during hot weather, wherein relatively warm air is directed to the upper region while quite cool air is discharged in the lower region. To overcome this problem it has been suggested to discharge the same temperature air to both the the upper and lower regions. However this too has proven somewhat ineffective in achieving a suitable temperature distribution within the vehicle cabin.

SUMMARY OF THE INVENTION

It is an object of the present invention to provide an air conditioning arrangement wherein the temperature in different zones or regions of a passenger compartment or cabin can be selectively controlled.

In brief, the present invention takes the form of an arrangement wherein the temperature of the air discharged into the upper region (for example) of the enclosed space defined by a passenger compartment or cabin and the temperature of the air discharged into the lower region (for example) thereof, is separately controlled in response to a manually inputted command and in response to at least one parameter which affects the environment of the cabin.

More specifically, a first aspect of the present invention takes the form of an air conditioning unit for conditioning air in an enclosed space having an upper region and a lower region, comprising: a duct arrangement for separately discharging air into the upper region and the lower region, a heat exchanging arrangement associated with the duct arrangement for varying the temperature of the air in the duct, and a temperature control device associated with the duct arrangement for selectively varying the temperature of the air discharged into the upper region and for selectively varying the temperature of air discharged into the lower region.

A further aspect of the invention is deemed to come in the form of a method of air conditioning an enclosed space using an air conditioning unit comprising the steps of: separately discharging air into an upper region and a lower region of the enclosed space via a duct arrangement, varying the temperature of the air in the duct arrangement using a heat exchanging arrangement which is associated with the duct arrangement, and selectively varying the temperature of the air discharged into the upper region and the temperature of the air discharged into the lower region using a temperature control device which is associated with the duct arrangement.

BRIEF DESCRIPTION OF THE DRAWINGS

The features and advantages of the arrangement of the present invention will become more clearly appreciated from the following description taken in conjunction with the accompanying drawings in which:

FIG. 1 is a schematic representation of an embodiment of the present invention which takes the form of a computer controlled air conditioning arrangement adapted for use with an enclosed space such as the passenger cabin of an automotive vehicle or the like;

DETAILED DESCRIPTION OF THE PREFERRED EMBODIMENTS

Figure 1:
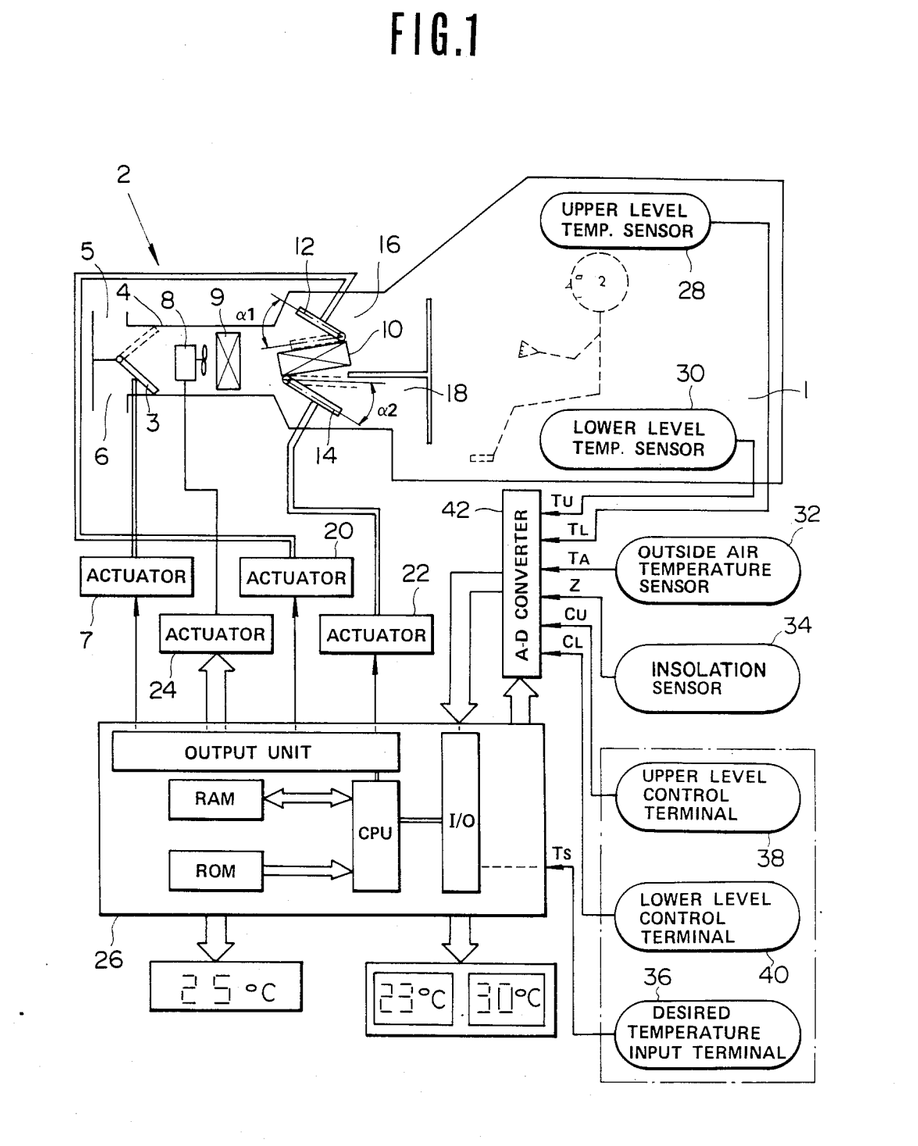

Turning now to FIG. 1, an air conditioning arrangement to which the embodiment of the present invention may be applied is shown. In this arrangement "air-conditioned air" is discharged into an enclosed space such as a vehicle cabin 1 or the like, by an air conditioning unit generally indicated by the numeral 2. This air conditioning system or unit is, by way of example, the type wherein air may be selectively inducted from the ambient atmosphere surrounding the cabin or from the cabin 1 per se, to be recirculated back thereinto, via a door 3 mounted at or near the upstream end of a duct 4. The duct is as shown, provided with an atmospheric air induction port 5 and a recirculation port 6. The position of the door 3 is controlled by an acuator 7.

Located downstream of the door 3 is a fan or blower 8.

Located downstream of the blower 8 is a evaporator 9 via which heat may be extracted from the air forced to flow through the duct 4 by the blower 8.

Further downstream of the evaporator 9 is a heater core 10 through which heated engine coolant is circulated. As illustrated, the heater core is arranged at a location just upstream of a branching or bifurcation of the duct.

Upper and lower mix doors 12 and 14 are arranged to vary the respective fractions of the air flows passing through each of the upper and lower sub passages 16 and 18 of the duct arrangement, which pass over and/or through the heater core 10 to be heated by same. By controlling the angular position of these doors (viz., $\alpha_1$, $\alpha_2$) the temperature of the air being discharged into the cabin through each of the sub passages (16, 18) can be controlled. Viz., in the heating mode, by controlling the angular position of each of the doors 12, 14, the amount of air being heated by the heater core 10 can be controlled in a manner to control final the temperature of the air discharged from each sub passage; while in the cooling mode the temperature of the air is firstly reduced to a suitably low level via use of the evaporator 9 and then subsequently slightly warmed during its passage through the sub passages 16, 18, to acheive the appropriate temperatures.

The angular positions ($\alpha_1$, $\alpha_2$) of the upper and lower mix doors 12 and 14 are controlled by actuators 20, 22, respectively.

The operation of the blower 8 is controlled by an actuator 24.

The operation of the above mentioned actuators are controlled by a microcomputer 26 which incorporates therein a RAM, a ROM and a CPU. The microcomputer 26 receives data input from a plurality of sources including an upper level temperature sensor 28 which senses the temperature of the air in the upper region of the cabin, a lower level temperature sensor 30 which senses the temperature of the air in the lower region of the cabin, an outside air temperature sensor 32 which senses the temperature of the ambient atmosphere external of the cabin, an insolation sensor 34 for sensing the effect of sunlight on the cabin environment, a desired temperature input terminal 36, an upper level control terminal 38 and a lower level control terminal 40.

It should be noted that the desired temperature input terminal 36 is, in this instance, capable of outputting a digital signal and as such need not be connected through the A-D converter 42 as are the other data sources.

The above mentioned insolation sensor 34 may be mounted either internally on top of the dash panel slightly aft of the windshield or externally on the cowl top grill forward of the windshield. On the other hand, the outside air temperature sensor 32 may be mounted in the vehicle bumper so as to shaded from the sun but exposed to adequate ventilation.

Figure 4:
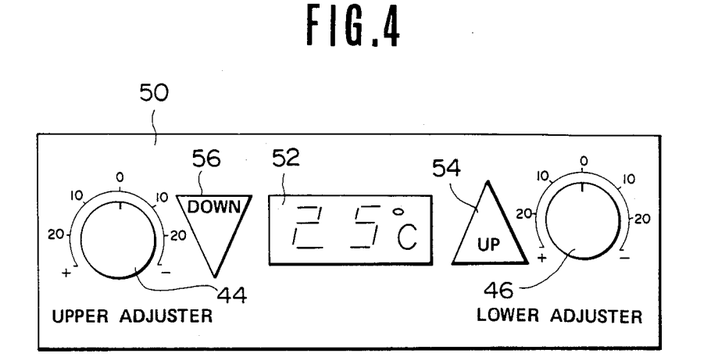
FIG. 4 is a sketch showing an example of a control panel of an input teminal via which the required temperature control data may be inputted to the control circuitry of the arrangement shown in FIG. 1.

The terminals 36, 38, 40 may be conveniently grouped togther in a form such as shown in FIG. 4, by way of example only.

The microcomputer 26 is programmed to process the various inputted data and appropriately control the operation of the blower, and the positions of the fresh-/recirculate control door and the upper and lower mix doors.

Figure 2:
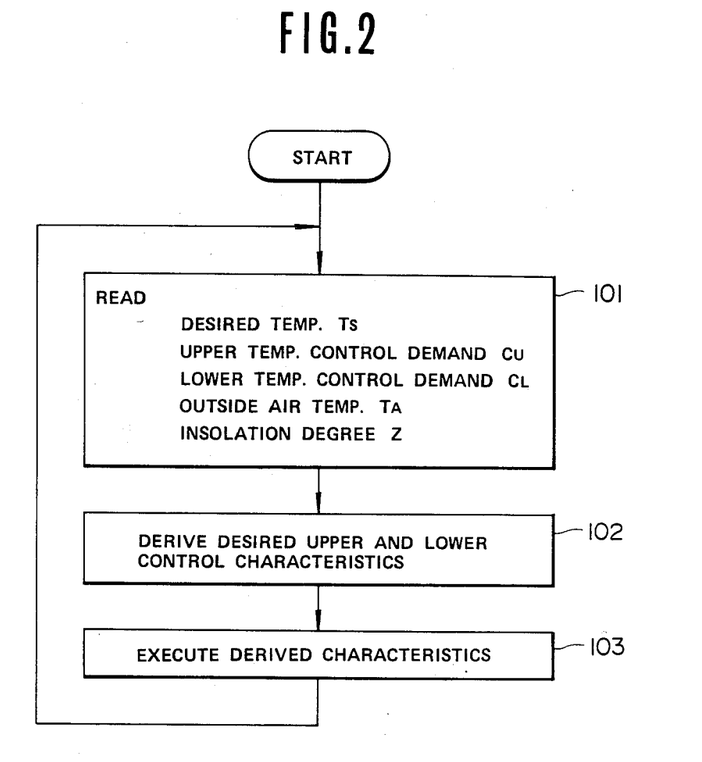
FIG. 2 is a simplified flowchart showing the procedure followed by the present invention.

FIG. 2 shows in simplified form, the steps followed in order to acheive the inventive control. As shown, subsequent to the start of the program (induced by switching the air conditioner on to its automatic mode) the desired cabin temperature ($T_S$), the upper temperature control demand ($C_U$), the lower temperature control demand ($C_L$), the temperature of the air outside of the cabin ($T_A$), and the insolation degree ($Z$) inputs are read in stage 101.

In stage 102, the program calculates or derives the temperatures of the air which must be discharged through each of the respective upper and lower sub passages 16, 18, to in fact achieve the required temperatures and temperature differential. In the final stage 103 the program induces suitable operation of the actuators (7, 20, 22, 24) to achieve the desired end.

Figure 3:
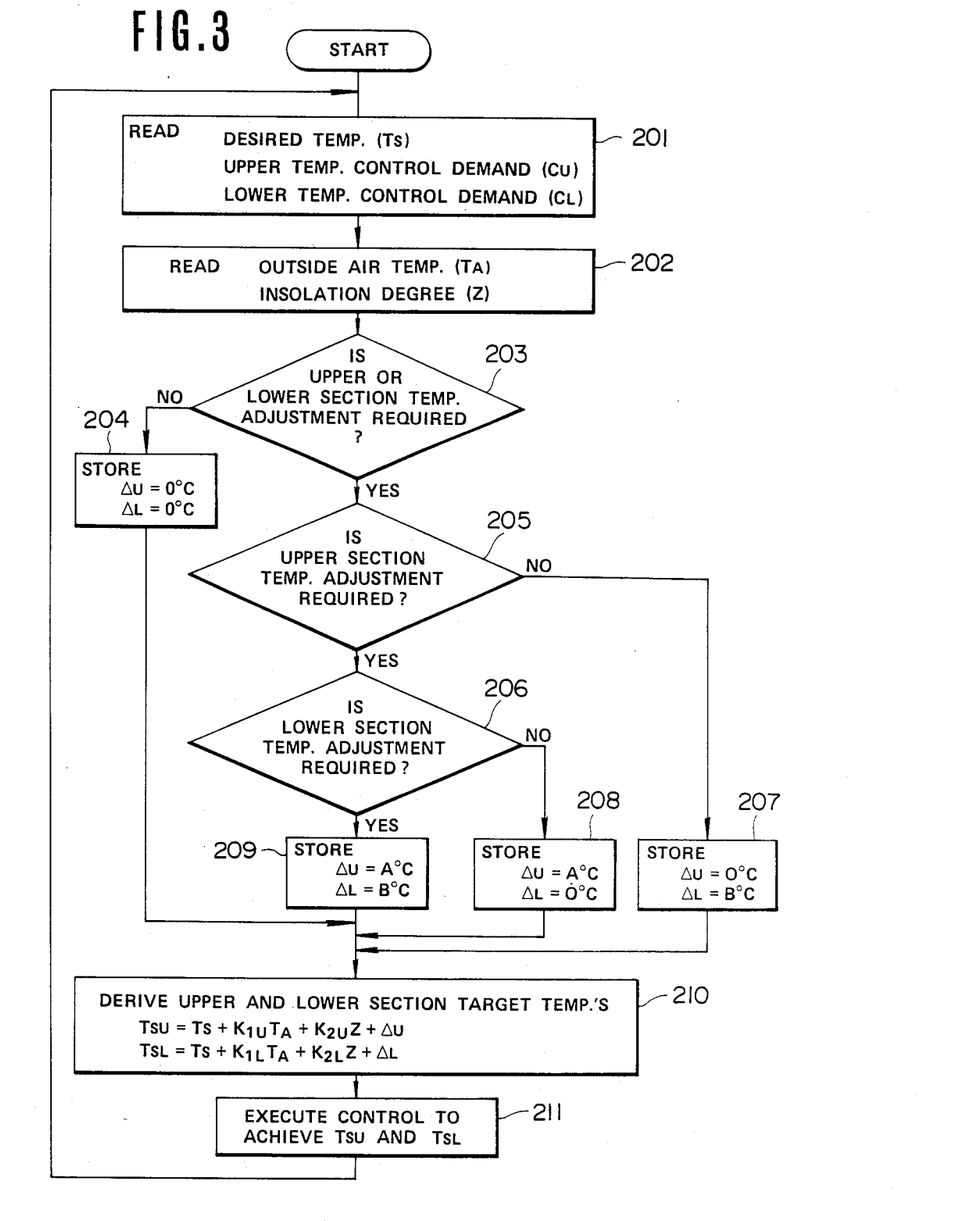
FIG. 3 is flowchart showing in more detail the procedure basically outlined in FIG. 2.

FIG. 3 shows in more detail the procedure followed by the microcomputer program. As shown in steps 201 and 202 the previously mentioned data is read. In step 203 the program, based on the data read in the previous steps, decides whether any adjustment to the basic desired temperature schedules is required. That is to say, the program decides, in view of the setting of the dials or knobs 44, 46 shown in FIG. 4, whether any deviation from what shall be referred to as a "standard" upper level and a "standard" lower level control schedule is required. This point will become clear hereinlater. In the event that no deviation is required, the program proceeds in step 204 to store in the RAM the data that the required upper and lower changes (deviations) are both zero degrees (Celsius merely by way of example). That is to say: $\Delta_U = 0°$ C., $\Delta_L = 0°$ C. However, in the case that at least the lower adjuster knob 46 has been manipulated, the program proceeds to step 205 wherein enquiry is made as to whether any deviation from the "standard" upper section control is required. In the event that no deviation is required in the upper section control, the program proceeds to step 207 wherein the data indicating the the upper required change is zero degrees and that the required lower deviation is (for purposes of explantion) "B" degrees.

However, if the answer to the question posed in step 205 is YES, then the program proceeds to step 206 wherein the enquiry as to need for lower section temperature adjustment is made. If the answer to this question is NO then the program proceeds to step 208 wherein the illustrated data is set into the RAM. In the case that the question posed in step 206 is YES, then the program proceeds to step 209 wherein the illustrated data is logged.

In stage 210, the program calculates or derives the upper and lower target temperatures $T_{SU}$ and $T_{SL}$. These calcuations are carried out using the equations:

$$T_{SU} = T_S + K_{1U}T_A + K_{2U}Z + \Delta_U \qquad (1)$$

$$i_{SL} = T_S + K_{1L}T_A + K_{2L}Z + \Delta_L \qquad (2)$$

wherein:
$T_S$ is the desired cabin temperature;
$K_{1U}$ and $K_{2U}$ are constants specifically pertaining to the upper level temperature control;
$Z$ is the degree of insolation to which the cabin is subjected;
$K_{1L}$ and $K_{2L}$ are constants specifically pertaining to the lower level temperature control; and
$\Delta_U$ and $\Delta_L$ are the required deviations from the standard control, viz., the control which would otherwise occur if the values of $\Delta_U$ and $\Delta_L$ were both zero.

In step 211, the program proceeds to execute the control necessary to achieve the derived target temperatures $T_{SU}$ and $T_{SL}$.

As shown the program is arranged to recycle back to step 201 in order to accommodate any changes that may be induced and/or necessary with the passing of time.

FIG. 4 shows (as briefly mentioned hereinbefore) an example of a control panel 50 which may be disposed within the cabin 1 of the vehicle in order to enable the required data input. This panel by way example includes a LED display 52 which indicates the selected "desired" temperature ($T_S$). Located on either side of the display are count up and count down buttons 54, 56 via which the desired temperature may be increased or decreased. Outboard of the count up and count down buttons 54, 56 are dials or knobs 44, 46 for varying the temperature of the air being discharged respectively into the upper and lower sections or regions of the cabin.

Figure 5:
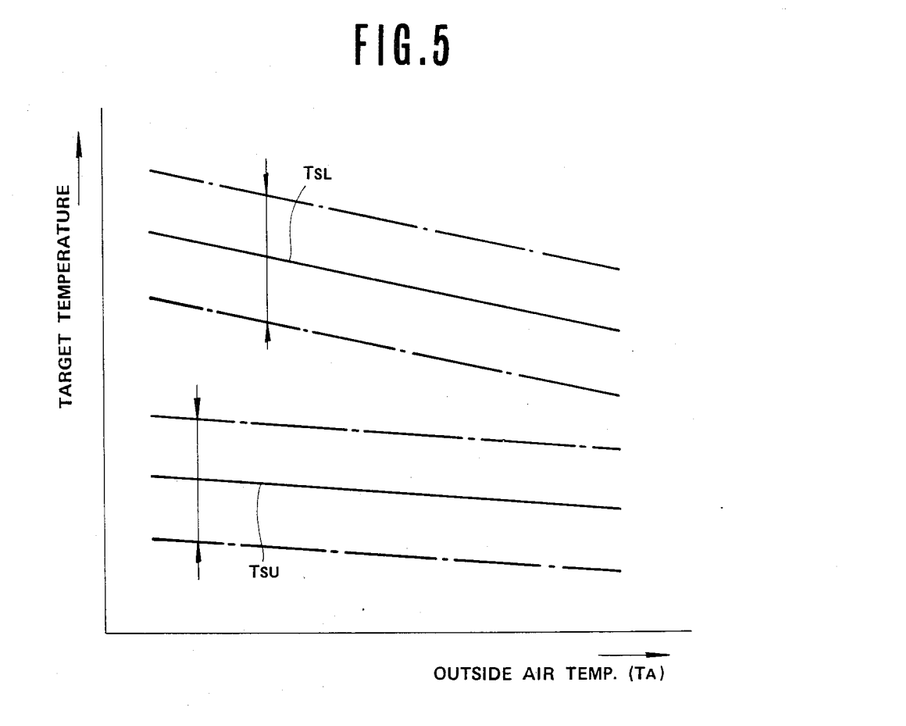
FIG. 5 is a graph showing, in terms of outside (ambient) air temperature and the temperature of the air which must be actually discharged from the air conditioning unit to achieve the desired temperature control (viz., "target" temperature), an example of the control characteristics possible with the present invention.

FIG. 5 is a graph showing in terms of target temperature (viz., $T_{SU}$ and $T_{SL}$) and the outside (of the cabin) air temperature $(T_A)$, an example of the control characteristics provided by the present invention. As shown, the so called "standard" target temperatures $T_{SU}$ and $T_{SL}$ traces are each located amid an adjustment zone the upper and lower limits of which are those to which the respective traces may be moved via selective rotation of the knobs or dials 44, 46. It should be appreciated that this graph is merely an example, and by varying the constants found in equations (1) and (2), the so-called "standard" traces may be moved closer to or further from each other as desired.

Figure 6:
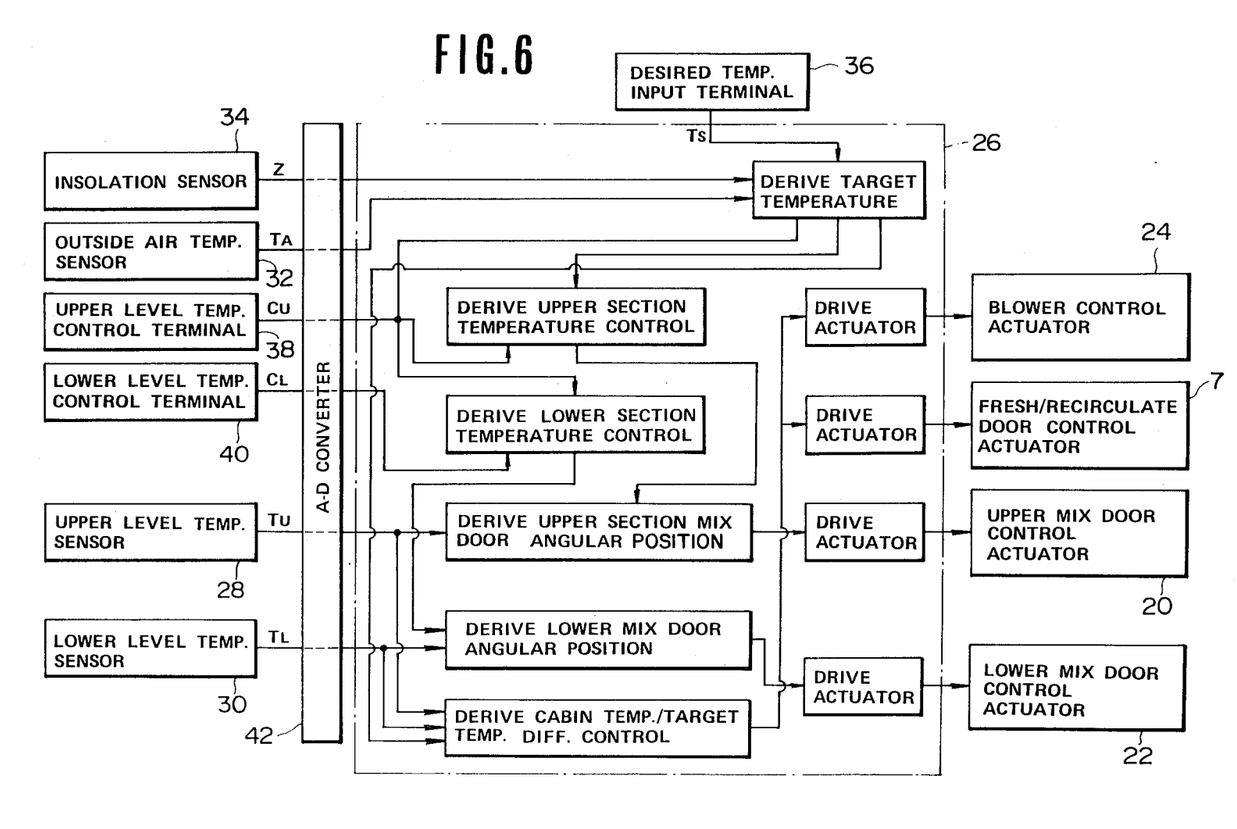
FIG. 6 is a schematic representation showing in functional terms the operations performed within the microcomputer shown in FIG. 1 and the various operative connections between said microcomputer, the various sensors and actuators illustrated in FIG. 1.

FIG. 6. shows in schematic form the functions performed by the microcomputer shown in FIG. 1. It will however be appreciated that each of the functional blocks may be replaced with suitable digital and/or analog circuits in the event it is required to construct such an embodiment.

If desired the panel arrangement shown in FIG. 4 may further include additional displays (See FIG. 1) which indicate the upper and lower region air temperatures (viz, display the outputs of sensors 28 and 30) and the external or outside air temperature $T_A$ (viz, display the output of sensor 32).

What is claimed is:

1. An air conditioning unit for conditioning air in an enclosed space having an upper region and a lower region, comprising:
   a duct arrangement for separately discharging air into said upper region and said lower region;
   a heat exchanging arrangement associated with said duct for varying the temperature of the air in said duct;
   a temperature setting means for setting a desired temperature in said enclosed space;
   a sensor arrangement including a device for sensing the temperature of the air in said upper region and the temperature of the air in the lower region and for outputting an indication thereof;
   a temperature control device associated with said duct arrangement for selectively varying the temperature of the air discharged into said upper region and for selectively varying the temperature of air discharged into said lower region; and
   a required deviation setting means for manually setting a first required deviation which is representative of a desired deviation from a first target temperature derived from said desired temperature and about which the temperature of air to be discharged into one of said upper and lower regions is adjusted; and
   a control circuit responsive to an input indicative of said desired temperature from said temperature setting means, and to an input indicative of said first required deviation from said required deviation setting means and to the output of said sensor arrangement for controlling said temperature control device for adjusting the temperature of air to be discharged towards the upper and lower regions separately from each other, said control circuit deriving said first target temperature and said second target temperature about which the temperature of air to be discharged into said lower region is adjusted, said first and second target temperatures being derived with respect to said desired temperature, and said first target temperature and second target temperature being mutually independently variable.

2. An air conditioning unit as claimed in claim 1, wherein said temperature control device cooperates with said heat exchanging arrangement for varying the temperature of the air in said upper region and in said lower region.

3. An air conditioning unit as claimed in claim 1, wherein said sensor arrangement further includes means for sensing at least one parameter affecting the environment of said enclosed space and for outputting an indication thereof to said control circuit.

4. An air conditioning unit as claimed in claim 3, wherein said sensing means takes the form of a device which measures the temperature of the air external of said enclosed space.

5. An air conditioning unit as claimed in claim 3, wherein said sensing means takes the form of a device for measuring the degree of insolation to which said enclosed space is subjected.

6. The air conditioning unit of claim 1, wherein said required deviation setting means further comprises a means for manually setting a second required deviation which is representative of a desired deviation from said second target temperature derived from said desired temperature and about which the temperature of air to be discharged into the other of said upper and lower regions is adjusted; and
   wherein said control circuit is also responsive to an input indicative of said second required deviation.

7. A method of air conditioning an enclosed space using an air conditioning unit comprising the steps of:
   setting a desired air temperature in said enclosed space;
   setting a first required deviation which is representative of a desired deviation from a first target temperature derived from said desired temperature and about which the temperature of air to be discharged into one of said upper and lower regions is adjusted;
   deriving said first target temperature to which the air temperature in said one of said upper and lower regions of the enclosed space is controlled relative to said desired temperature;
   separately discharging air into said upper region and said lower region of said enclosed space via a duct arrangement;
   sensing the temperatures in said upper region and in said lower region;
   varying the temperature of the air in said duct arrangement using a heat exchanging arrangement which is associated with said duct arrangement; and
   selectively varying the temperature of the air discharged into said one of said upper and lower regions using a temperature control device which is associated with said duct arrangement, said temperature of the air discharged into said one of said upper and lower regions being varied on the basis of said first target temperature, said required deviation, and the sensed air temperature in said one of said upper and lower regions.

8. A method as claimed in claim 7, further comprising the step of:
   sensing at least one parameter affecting the environment of said enclosed space and outputting an indication thereof to said control circuit.

9. The method of claim 7, wherein the step of setting a first required deviation further comprises setting a second required deviation which is representative of a desired deviation from a second target temperature derived from said desired temperature and about which the temperature of air to be discharged into the other of said upper and lower regions is adjusted.

10. An air conditioning unit for conditioning the air in an enclosed space having an upper region and a lower region, comprising:
   a duct having an upstream end into which air is inducted and a bifurcate downstream end defining first and second discharge passages through which air is separately discharged into said upper and lower regions respectively;
   an induction control device associated with said upstream end for selectively causing the air inducted into said duct to be inducted from one of (a) the atmosphere external of said enclosed space and (b) said enclosed space;
   a blower associated with said duct for blowing air therethrough;
   a heat exchanging arrangement including a cooling device for cooling the air in said duct and a heating device for heating the air in said duct;
   a flow control arrangement associated with said bifurcate downsteam end of said duct for selectively and individually controlling the amount of air flowing through said first and second discharge passages with is exposed to said heat exchanging arrangement in a manner that the temperature thereof is varied;
   a sensor arrangement including devices for sensing the temperature of the air in said upper region and the temperature of the air in said lower region and outputting an indication thereof;
   an input device for setting a desired temperature and for setting a first required deviation which is representative of a desired deviation from a first target temperature derived from said desired temperature and about which the temperature of air to be discharged into one of said upper and lower regions is adjusted; and
   a processor responsive to the output of said sensor arrangement and said input device and which is arranged to control the operation of said induction control device, said blower, and said flow control arrangement, said processor deriving said first target temperature and adjusting said first target temperature in accordance with said required deviation and a control signal for controlling said induction control device, and said blower on the basis of the temperature difference between the air temperature in said one of said upper and lower regions and said adjusted first target temperature.

11. An air conditioning unit as claimed in claim 10, wherein said sensor arrangement further includes means for sensing at least one parameter affecting the environment of said enclosed space.

12. An air conditioning unit as claimed in claim 11, wherein said parameter sensing means includes a sensor which senses the temperature of the air external of said enclosed space and a sensor for sensing the degree of insolation to which said enclosed space is subjected.

13. An air conditioning unit as claimed in claim 12, wherein said processor takes the form of a microcomputer having a RAM, a ROM and a CPU incorporated therein, said microcomputer being programmed to calculate the temperature of the air which must be discharged from said first discharge passage and the temperature of the air which must be discharge from said second discharge passage, in order to achieve the temperatures indicated by said input device.

14. An air conditioning unit as claimed in claim 13, wherein said program derives the temperature of the air which must be discharged from said first and second discharge passages respectively using the following equations:

$$T_{SU} = T_S + K_{1U}T_A + K_{2U}Z + \Delta_U \quad (1)$$

$$T_{SL} = T_S + K_{1L}T_A + K_{2L}Z + \Delta_L \quad (2)$$

wherein:
   $T_{SU}$ is the temperature of the air discharged from said first discharge passage;
   $T_{SL}$ is the temperature of the air discharged from said second discharge passage;
   $T_S$ is the desired cabin temperature;
   $K_{1U}$ and $K_{2U}$ are constants specifically pertaining to the upper level temperature control;
   $Z$ is the degree of insolation to which the cabin is subjected;
   $K_{1L}$ and $K_{2L}$ are constants specifically pertaining to the lower level temperature control; and
   $\Delta_U$ and $\Delta_L$ are the required deviations from the control which would occur if the values of $\Delta_U$ and $\Delta_L$ were both zero.

15. The air conditioning unit of claim 10, wherein said input device further comprises a means for setting a second required deviation which is representative of a desired deviation from a second target temperature and about which the temperature of air to be discharged into the other of said upper and lower regions is adjusted.

16. An air conditioning unit comprising:
   a conditioning air passage means including a first passage directed toward the upper region of a vehicle cabin and a second passage directed toward the lower region of the vehicle cabin;
   a first means associated with said first passage, for adjusting conditioning air temperature discharged into the vehicle cabin through said first passage;
   a second means associated with said second passage, for adjusting conditioning air temperature discharged to the vehicle cabin through said second passage;
   third means disposed within one of said upper and lower regions of the vehicle cabin for sensing the temperature in said one of said upper and lower regions to produce a first sensor signal indicative thereof;
   fourth means disposed within the other of said upper and lower regions of the vehicle cabin for sensing the temperature in said other region to produce a second sensor signal indicative thereof;
   fifth means for setting a desired temperature in the vehicle cabin and a first required deviation from said desired temperature;
   sixth means, associated with said fifth means, for deriving a first target temperature relative to said desired temperature and said first required deviation, for controlling the air temperature in said one of said upper and lower regions thereto, and a second target temperature relative to said desired temperature for controlling the air temperature in the other of said upper and lower regions thereto; and seventh means, associated with said first and second means, for controlling the operation thereof independently of each other, for adjusting the conditioning air temperature to be discharged into said one of said upper and lower regions on the basis of the temperature difference between said first target temperature and the air temperature sensed by said third means, and adjusting the conditioning air temperature to be discharged into the other of said upper and lower regions on the basis of the temperature difference between said second target temperature and the air temperature sensed by said fourth means.

17. The air conditioner system as set forth in claim 16, wherein said first target temperature is lower than said second target temperature.

18. The air conditioning unit of claim 16, wherein said sixth means further comprises means for adjusting said second target temperature in accordance with a second required deviation; and wherein said seventh means comprises means for adjusting the conditioning air temperature to be discharged into the other of said upper and lower regions on the basis of the temperature difference between said adjusted second target temperature and the air temperature sensed by said fourth means.

* * * * *